United States Patent
Becker et al.

[15] 3,665,159
[45] May 23, 1972

[54] HEATING SYSTEM CONTROL

[72] Inventors: Stephen A. Becker; Donald E. Knoop, both of Benton Harbor, Mich.

[73] Assignee: Whirlpool Corporation

[22] Filed: Oct. 19, 1970

[21] Appl. No.: 81,900

[52] U.S. Cl. .................................. 219/497, 219/501
[51] Int. Cl. ........................................... H05b 1/02
[58] Field of Search ................... 219/497, 501, 499, 494

[56]  References Cited

UNITED STATES PATENTS 3,161,759  12/1964  Gambill et al. ................. 219/494
3,296,419  1/1967  Sels ................................. 219/499

Primary Examiner—Bernard A. Gilheany
Assistant Examiner—F. E. Bell
Attorney—Hofgren, Wegner, Allen, Stellman & McCord

[57] ABSTRACT

A control for regulating an electric heater of a heating system to provide substantially maximum rate of elevation of the system temperature at start-up without overshooting a preselected temperature to which the system is to be heated. The control includes means for sensing the instantaneous difference between the system temperature and the preselected temperature and for performing control operations based on the sensed temperature information to provide the desired control of the heater. The control may be further arranged for selective use as an infinite heat control as desired.

13 Claims, 4 Drawing Figures

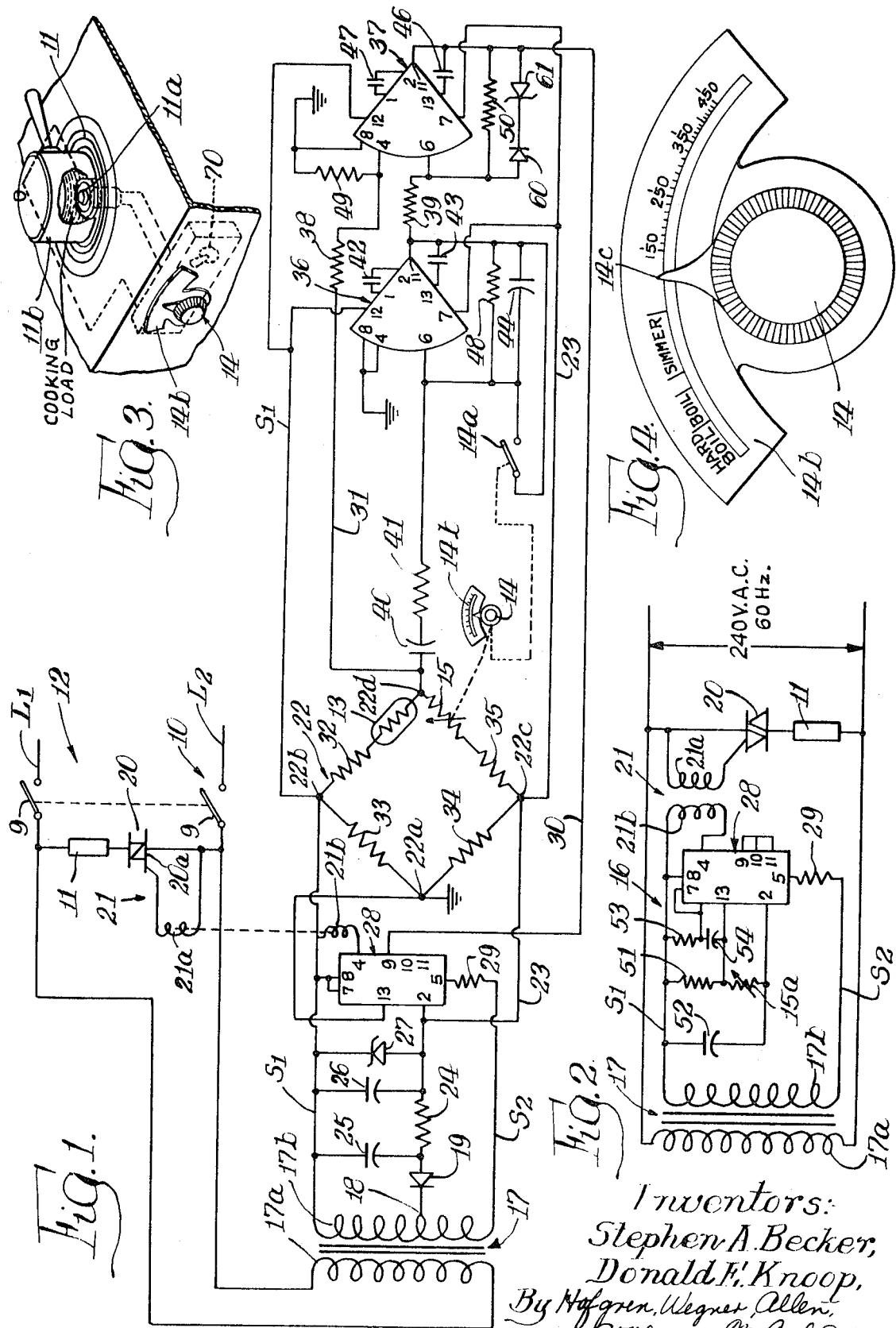

HEATING SYSTEM CONTROL

BACKGROUND OF THE INVENTION

1. Field of the Invention

This invention relates to electrical controls and in particular to controls for controlling the operation of electrical heaters such as electric range surface units.

2. Description of the Prior Art

In the conventional electrical heater system, such as an electric oven or electric range surface unit, manually adjustable controls are provided for controlling the electrical energization of the heater. Temperature responsive means are associated with the controls for discontinuing the energization of the heater when the system reaches a preselected set temperature. The control may further include means for cycling the heater about the preselected temperature once this temperature is reached.

A serious problem arises in such conventional controls in that the heat capacity of the system may cause the temperature to overshoot the preselected temperature when the heater energization is discontinued at the preselected temperature.

It is desirable in such controls to bring the system up to the preselected temperature as quickly as possible. Heretofore such control has usually been effected by continuously energizing the heater until the preselected temperature is obtained.

SUMMARY OF THE INVENTION

The present invention comprehends improved control for regulating the electric heater of a heating system eliminating the disadvantages of the above-discussed conventional controls in a novel and effective manner.

More specifically, in the present invention, means are provided for sensing the instantaneous difference between the temperature of the system and a preselected temperature and utilizing this information to control the heater so as to provide a full power energization to bring the system temperature rapidly to a temperature below the preselected temperature accurately coordinated with the rate of change of the system temperature and the difference between the system temperature and the preselected temperature to effectively preclude overshoot of the system temperature beyond the preselected temperature caused by the heat capacity of the system. The control is arranged to maintain the temperature of the system substantially at the preselected temperature by a subsequent cyclical energization of the heater.

The control includes means for providing minimum heat up time without temperature overshoot for all kinds of cooking loads, including cooking loads of large heat capacity, such as aqueous cooking loads.

The control is further arranged to provide selectively an infinite control of the heater when desired.

BRIEF DESCRIPTION OF THE DRAWING

Other features and advantages of the invention will be apparent from the following description taken in connection with the accompanying drawing wherein:

FIG. 1 is a schematic diagram illustrating the electric circuitry of a heating system control embodying the invention;

FIG. 2 is a schematic diagram of a portion of a control selectively substitutable for a portion of the control illustrated in FIG. 1 to provide an infinite heat control;

FIG. 3 is a fragmentary perspective of an electric range surface unit provided with a temperature control embodying the invention; and FIG. 4 is an enlarged view of the temperature setting dial for the heating system control embodying the invention.

DESCRIPTION OF THE PREFERRED EMBODIMENT

In the exemplary embodiment of the invention as disclosed in the drawing, a control generally designated 10 is shown for use in regulating the electric heater 11 of a heating system generally designated 12, such as an electric range surface unit. The control includes thermistor means 13 for sensing the temperature of the system adjacent the heater 11. Thermistor 13 may comprise the temperature sensitive unit of a conventional spring-loaded surface unit sensing means 11a (FIG. 3) arranged to press against the bottom of a utensil placed on heater 11 for providing a variation in the resistance as a function of the temperature of the utensil surface in the well known manner. A manually operable control knob 14 is provided for adjusting a control resistor 15 to provide a preselected input temperature signal to the control. The control functions to energize heater 11 effectively continuously in raising the temperature to a temperature slightly below the preselected temperature set by the control knob 14 and permits the heat capacity of system 12 to bring the system accurately to the preselected temperature. The control then functions to maintain the system at the preselected temperature by cyclical energization of heater 11. The control further includes an auxiliary portion 16 which may be selectively substituted in the control to provide an infinite heat control of heater 11 when desired.

More specifically, heater 11 may comprise a conventional sheathed electrical resistance heating unit such as a conventional 8-inch electric range surface unit having a rating of 2,600 watts adapted to provide a temperature range of approximately 150° to 450° F. Control 10 functions to regulate the system temperature to within approximately plus or minus 10° F. at the lower end of the temperature range and to within approximately plus or minus 20° F. at the high end of the temperature range. Electrical energization of heater 11 and control 10 may be effected from a suitable 240-V. 60 cycle AC conventional power supply through leads L1 and L2 connected to the primary winding 17a of a step-down transformer 17. The secondary winding 17b of transformer 17 is arranged to provide a 24 volt secondary voltage and includes a center tap 18 providing a 12 volt connection to a rectifying diode 19. Heater 11 is connected in parallel with transformer primary 17a across the AC power supply leads L1 and L2 in series with a Triac 20. The Triac 20 comprises a conventional solid state switching device utilizing reverse biased PN junctions for open circuiting the device when no voltage is applied to the gate terminal. By applying a pulse to the gate terminal at the beginning of each half cycle of the load current, an effectively noninterrupted flow of alternating load current may be provided to heater 11. The provision of such pulses to the Triac gate at the beginning of each half cycle of the load current comprises zero point switching thereof as well known to those skilled in the art. A 1-to-1 ratio pulse transformer 21 includes a secondary winding 21a connected between Triac 20 and the AC power supply lead L2.

Connected to one end of secondary winding 17b is a secondary lead S1 and connected to the opposite end of winding 17b is a secondary lead S2. A bridge circuit generally designated 22 is connected between lead S1 and a lead 23 connected through a resistor 24 and diode 19 to center tap 18. A pair of filter condensers 25 and 26 are connected between lead S1 and the opposite ends of resistor 24, and a Zener diode 27 is connected between lead S1 and lead 23 to maintain the control voltage accurately at 12 volts. A zero crossover switch 28 of conventional construction, such as that manufactured by the General Electric Company as its catalog item GEPA-424, Zero Voltage Switch, described in detail in General Electric Company Semiconductor Publication 85.21, 8167, is connected between leads S1 and S2 in series with a current limit resistor 29. The zero crossover switch functions in a conventional manner to receive two inputs at terminals 9 and 13 for providing a pulsed output through the primary winding 21b of pulse transformer 21a thereby to apply a control pulse to the gate 20a of Triac 20. As shown in FIG. 1, the pulse transformer primary 21b is connected between terminal 4 of the switch 28 and lead S1. Terminals 7 and 8 are connected directly to leads S1, terminal 13 is connected to connection 22a of bridge 22 and ground, terminal 2 is connected to lead 23, terminal 5 is connected to resistor 29, and terminal 9 is connected to a lead 30 to complete the connections to switch 28.

Connection 22b of the bridge is connected to lead S1 and connection 22c thereof is connected to lead 23. The fourth connection 22d of bridge 22 is connected to a lead 31. Thermistor 13 is connected in series with a resistor 32 between connections 22b and 22d of the bridge; a resistor 33 is connected between connections 22a and 22b; a resistor 34 is connected between connections 22a and 22c and a resistor 35 is connected in series with variable resistor 15 between connections 22c and 22d.

Thus, bridge 22 provides a control signal as a function of the resistance of thermistor 13 and the adjusted resistance of resistor 15. Resistors 32, 33, 34, and 35 are selected so that when the thermistor resistance is equal to the adjusted resistance of resistor 15, bridge 22 is balanced.

A pair of amplifiers generally designated 36 and 37 are connected between lead S1 and lead 30 to provide a signal to terminal 9 of switch 28 as a function of the voltage difference between connections 22d and 22a of the bridge. More specifically, amplifier 36 comprises a conventional integrated circuit differentiating amplifier illustratively comprising a Model MC1431 operational amplifier manufactured by Motorola, Inc. Amplifier 37 comprises a conventional integrated circuit forming amplifier illustratively comprising a Model MC1430 operational amplifier manufactured by Motorola, Inc. Models MC1430 and 1431 operational amplifiers are described in detail in Motorola Semiconductor Products Inc. Publication 1602-2, 8/68. Amplifier 36 and its associated circuitry including capacitor 40 constitute means for obtaining the rate of change of the temperature difference between the instantaneous temperature of the system sensed by the sensing means 13 and the preselected temperature established by the adjustment of resistor 15, which temperature difference is obtained from bridge 22. Amplifier 37 and its associated circuitry constitute means for amplifying the rate of change of the temperature difference, and adding the amplified rate of change of the temperature difference to the temperature difference to provide the desired regulating signal. Amplifier 37 which effectively comprises a differential amplifier thus functions to provide a composite voltage signal to lead 30 made up of a voltage related to the temperature difference obtained via bridge 22 delivered from lead 31 through a resistor 38 to terminal 4 of amplifier 37, and a voltage signal delivered from terminal 11 of amplifier 36 through a resistor 39 to terminal 6 of amplifier 37, which last-mentioned voltage signal is proportional to the rate of change of the voltage delivered to terminal 6 of amplifier 36 from connection 22d of bridge 22 through a capacitor 40 and resistor 41. Amplifiers 36 and 37 are noise filtered by means of resistor 41 and capacitors 42, 43, 44, 46 and 47. As shown in FIG. 1, capacitor 42 is connected across terminals 1 and 2 of amplifier 36. Lead S1 is connected to terminal 12, terminals 8 and 4 are grounded, resistor 41 is connected to terminal 6, capacitor 44 is connected in parallel with a resistor 48 between terminals 6 and 11, terminal 7 is connected to lead 23, capacitor 43 is connected between terminals 13 and 11 and resistor 39 is connected to terminal 11.

Capacitor 47 is connected between terminals 2 and 1 of amplifier 37, terminal 12 thereof is connected to lead S1. Terminal 8 is connected to ground, terminal 4 is connected to resistor 38, and through a resistor 49 to ground, terminal 6 is connected to resistor 39, a serially connected diode 60 and a Zener diode 61 are connected in parallel with a resistor 50 between terminal 6 and terminal 2, terminal 7 is connected to lead 23, terminal 13 is connected through capacitor 46 to lead 30, and terminal "11" is connected directly to lead 30.

Diode 60 and Zener diode 61 are connected in series in parallel relation with resistor 50 between terminal 6 and terminal 2 to prevent saturation of amplifier 37 during a cooking operation. In the event the control 10 is re-adjusted after the cooking operation is underway, were it not for diode 60 and Zener diode 61, such saturation could occur causing temporary interruption of the desired positive and accurate control of the heater 11.

In one example of control 10 as discussed above, the circuit components are as follows:

| Reference Numeral | Identification |
|---|---|
| 13 | Thermistor, 15 ohms; positive temperature coefficient of resistance |
| 15 | Variable resistor; 50 ohms |
| 17 | Transformer: 240V.: 24V., center tap; 100 ma. |
| 19 | Diode; 1N 4002 |
| 20 | Triac: RCA 40576, 400V., 15a |
| 21 | Pulse transformer: 1:1 |
| 24 | Resistor; 39 ohms, 1/2 w. |
| 25 | Condenser-electrolytic mfd.; 300mf, 25V. |
| 26 | Condenser-electrolytic; 300 mfd., 15V. |
| 27 | Zener diode; 12V., 1 w. |
| 28 | Zero crossover switch; General Electric Co. PA424 |
| 29 | Resistor; 2500 ohms, 2 w. |
| 32-35 | Resistors; 150 ohms, 1/2 w. |
| 36 | Operational amplifier; Motorola, Inc. MC1431 |
| 37 | Operational amplifier; Motorola, Inc. MC1430 |
| 38 | Resistor; 10,000 ohms |
| 39 | Resistor; 1,000 ohms |
| 40 | Capacitor-electrolytic; 50 mfd, 15V. |
| 41 | Resistor; 1,000 ohms 1/2 w. |
| 42, 43 | Capacitors; 0.1 mfd., 20V. |
| 44 | Capacitor; 5 mfd, 20V. |
| 46, 47 | Capacitors; 0.1 mfd., 20V. |
| 48 | Resistor; 100,000 ohms |
| 49 | REsistor; 1,000 ohms |
| 50 | Resistor; 100,000 ohms |
| 60 | Diode; 1N 34 |
| 61 | Zener diode; 5.1 V., 400 mw. |

Amplifiers 36 and 37 function as discussed above to provide a composite output voltage to terminal 9 of the switch 28 which effectively is a function of the temperature difference between the instantaneous temperature of the system 12 as sensed by thermistor 13 and the preselected temperature set into the control by adjustment of resistor 15, and to the rate of change of the temperature difference effected by the energization of heater 11. Switch 28 accordingly constitutes means for comparing a combination of the temperature difference and the rate of change of the temperature difference with a reference established by adjustable resistor 15 to provide a regulating signal to control pulse transformer 21 and thereby Triac 20. Switch 28 thus controls the pulse transformer 21 so as to control Triac 20 suitably to terminate the energizing of heater 11 accurately prior to the temperature sensed by thermistor 13 reaching the preselected temperature set by resistor 15 to permit the thermal inertia of system 12 to bring the temperature of the system accurately to the preselected temperature. Thus, the effect of the signal delivered to terminal 9 of switch 28 is to de-energize the heater 11 prior to the time that bridge 22 is fully balanced. As will be obvious to those skilled in the art, amplifiers 36 and 37 may be designed as a single integrated circuit component in lieu of utilization of the conventional commercially available amplifiers discussed. Similarly, amplifiers 36 and 37 may be combined with zero crossover switch 28 in a single integrated circuit in lieu of the use of the conventional commercially available amplifiers 36 and 37 and switch 28.

Control 10 operates to control heater 11 as a function of the difference between the temperature set by resistor 15 and the temperature of the system as sensed by thermistor 13. When the operation of the system is initiated by closing a conventional switch such as a toggle switch 9 to supply 240 v. AC power to the system via leads L1 and L2, and knob 14 is operated to adjust resistor 15 to a preselected temperature setting, the sensed temperature being below the preset temperature, bridge 22 is not balanced and a voltage signal is provided from amplifier 37 to switch 28 through lead 30 suitable to cause Triac 20 to conduct full load current to heater 11. More specifically, during the heating up of the system, switch 28 provides pulses to gate 20a of the Triac causing the Triac to provide full sine wave current to the heater 11. Such full load current is maintained through the heater until such time as the signal from amplifier 37 terminates delivery of pulses from switch 28 to gate 20a. The termination of such pulse delivery occurs at a temperature less than the preselected temperature set by resistor 15 as controlled by the two inputs to amplifier 37 of the temperature difference and rate of change of the temperature difference as discussed above. Thus, the control 10 functions to switch off the Triac 20 at a suitable time to permit the thermal inertia of system 12 to bring the temperature of the system accurately to the preselected temperature set by resistor 15 without overshooting thereof while yet effecting such accurate temperature achievement in substantially minimum time by maintaining the energization of the heater at full current automatically up to the point where the thermal inertia will complete the temperature elevation. It has been found that control 10 permits bringing of the temperature to the preselected temperature within 10 percent of the time involved when manual switching of the control is utilized. The system is effectively insensitive too variations in the parameters thereof, such as size and power rating of the heater 11, thermal characteristics of the load, e.g. the utensil placed on the heater, etc. An important feature of the system is the inherent self compensation it provides for handling different cooking loads uniformly with excellent results.

By utilizing a zero crossover switch, minimum radio frequency interference results as the full sine wave current is utilized during the time the system is brought to temperature. The use of transformers 17 and 21 provides effective electrical isolation of the control means from the high voltage power supply. The usage of the solid state components provides high reliability and life, as well as low cost maintenance of the control.

Once the preset temperature is reached, heater 11 is cyclically operated under the control of switch 28 to provide a high gain, low hysteresis power switching of Triac 20 effectively comprising a relatively fast on-off cycling mode of operation with power "on" times of proper length to maintain the load substantially at the preselected temperature. This operation is effected by the provision of a suitable signal through lead 30 from amplifier 37 when the bridge 22 becomes unbalanced as a result of the temperature being sensed by thermistor 13 dropping a predetermined small amount below the preselected temperature set by resistor 15. This signal is effective to minimize the temperature swing about the preselected set point even though the rate of change of temperature signal obtained from amplifier 36 is relatively small once the preset temperature is reached.

The heating system control of the present invention includes means for selectively bypassing the means for obtaining the rate of change of temperature difference between the preset temperature and the second temperature such that a cooking load of large heat capacity, for example an aqueous cooking load such as a pan 11b of water or the like (FIG. 3), may be brought up to the preselected temperature in minimum time. Since the sensing means 11a contacts the pan, which effectively is part of the heating system, rather than the cooking load in the pan, when the cooking load is of large heat capacity such as an aqueous cooking load, the control as described above may begin cycling the heater somewhat prematurely thus resulting in a longer heat-up time. Control 10 may therefore advantageously include a switch 14a which may be manually closed for selectively bypassing or shorting out the amplifier 36 do prevent premature cycling in the heating of cooking loads of large heat capacity. Switch 14a may advantageously be associated with the control knob 14 as indicated in FIG. 1. The temperature setting dial 14b (FIG. 4) may advantageously be calibrated on the left-hand portion thereof to show cooking terms associated with aqueous cooking loads such as "Hard Boil," "Boil" and "Simmer." For the portion of the dial used for handling non-aqueous cooking loads the dial may advantageously be calibrated with temperature calibrations such as 150° F., 250° F., 350° F., etc. as shown in FIG. 4 on the right-hand portion of the dial 14b.

Thus, the control knob 14 may be adjusted to set the pointer 14c in alignment with the desired temperature calibration for the cooking load. In the event the cooking load is a cooking load of large heat capacity, such as a pan of water, knob 14 is adjusted to the desired setting at the left-hand portion of the dial with movement of knob 14 to the left-hand portion of the dial operating the associated switch 14a to the closed position effectively bypassing the amplifier 36 and thereby minimizing heat-up time for the cooking load of large heat capacity.

As indicated briefly above, the zero crossover switch 28 may be utilized to provide an infinite heat control which permits virtually infinite adjustment of the heat output over its entire range in a continuous manner in lieu of the automatic control of the circuit as described above. Thus, as shown in FIG. 2, switch 28 may be actuated directly by a connection of an adjustable resistor 15a between terminals 2 and 13 thereof by suitable substitution of elements of the circuit of FIG. 2 in the control 10 as by selective switching thereof via suitable conventional switching means, not shown, such conventional switching means being well known in the art, which may advantageously include a toggle switch 70 shown in broken line in FIG. 3, which may be selectively operated to provide an infinite heat control in lieu of the automatic temperature control of the circuit as described above. More specifically, as shown in FIG. 2, the secondary winding 17b of power transformer 17 may be connected across switch 28 through series resistor 29 by connections to leads S1 and S2. Thus, terminal 8 of switch 28 is connected to lead S1 and terminal 5 is connected through resistor 29 to lead S2. Terminal 9 of switch 28 is connected to a lead connecting terminals 10 and 11 of switch 28. As before, pulse transformer primary 21b is connected between lead S1 and terminal 4 of switch 28. Adjustable resistor 15a is connected in series with a fixed resistor 51 and in parallel with a capacitor 52 between power supply lead S1 and switch terminal 2. The connection between resistor 15a and resistor 51 is connected to switch terminal 13. A resistor 53 and capacitor 54 are connected in series between lead S1 and terminal 13 and the connection between resistor 53 and capacitor 54 is connected to terminal 7 of switch 28.

Pulse transformer secondary winding 21a is connected to Triac 20 in series with heater 11 between power supply leads L1 and L2 as before.

Thus, when control 10 is arranged to utilize the auxiliary circuitry of FIG. 2, control of Triac 20 is infinitely adjustable by means of the setting of resistor 15a to provide an infinitely adjustable output of pulses through transformer 21 in controlling the operation of Triac 20.

Thus, the invention comprehends an improved control for bringing a heater up to temperature quickly and efficiently and maintaining the heater at the preselected temperature. The control effectively eliminates overshooting of the desired temperature to permit improved sensitivity in the use of the heater which is particularly desirable where the heater comprises an electric range or cooking top surface heating unit. The control may be readily readjusted at any time to provide different heat conditions which again offers high desirability in cooking use. By eliminating the overshoot, accurate low temperature control may be obtained without scorching delicate foods, such as butter or chocolate, and the control is particularly well adapted for maintaining foods warm, such as at a low temperature of approximately 130° F. Elimination of the temperature overshoot effectively minimizes spattering and the like as may occur where the heater is utilized in frying operations. As the control may be readily changed, the burner is well adapted for successfully cooking foods of different temperature requirements, such as bacon and eggs. Resultingly, control 10 permits a user to more accurately control the cooking operation in accordance with the user's personal preferences and cooking needs. Rapid and facilitated adjustment of the cooking temperature may be effected.

The foregoing disclosure of a specific embodiment is illustrative of the broad inventive concepts comprehended by the invention.

The embodiments of the invention in which an exclusive property or privilege is claimed are defined as follows:

1. In a heating system having an electric heater, a control for regulating the heater comprising:
   means for sensing the temperature of the system; and
   means for energizing the heater to bring the temperature of the system up to a preselected temperature and for regulating the energization of the heater subsequent to the system reaching said preselected temperature to maintain the system temperature substantially at said preselected temperature including (a) means responsive to the difference between the instantaneous temperature of the system sensed by said sensing means and said preselected temperature and (b) means responsive to the rate of change of said temperature difference effected by the energizing of said heater to terminate the energizing of the heater accurately prior to the sensed temperature reaching said preselected temperature to permit the heat capacity of the system to bring the temperature thereof accurately to said preselected temperature.

2. The heating system control of claim 1 wherein said energizing means is arranged to provide full power to said heater to bring the heater to said preselected temperature.

3. The heating system control of claim 1 wherein said energizing means comprises means for cycling the heater to maintain the system temperature within a preselected range at said preselected temperature.

4. The heating system control of claim 1 wherein said energizing means includes means for obtaining said temperature difference, means for obtaining the rate of change of said temperature difference, and means for comparing a combination of the temperature difference and the rate of change of the temperature difference with a reference to provide a regulating signal, and means for controlling the energization of the heater as a function of said signal.

5. The heating system control of claim 4 wherein said comparing means provides a series of pulses and said last named means comprises an electronic switching device responsive to said pulses.

6. The heating system control of claim 4 wherein said last named means comprises an electronic switch and said comparing means provides zero point switching of said electronic switch to bring said system temperature to said preselected temperature.

7. The heating system control of claim 1 wherein said energizing means includes means for obtaining said temperature difference; means for obtaining the rate of change of said temperature difference; means for amplifying said rate of change of said temperature difference, and adding the amplified rate of change of said temperature difference to said temperature difference to provide a regulating signal, and means for controlling the energization of the heater as a function of said signal.

8. The heating system control of claim 7 wherein said energizing means includes means for selectively bypassing said means for obtaining the rate of change of said temperature difference, whereby cooking loads of large heat capacity may be brought up to said preselected temperature in minimum time.

9. The heating system control of claim 8 wherein said bypassing means comprises switch means.

10. The heating system control of claim 1 wherein there is isolating transformer means provided for isolating the control from an electrical power supply to which the control is connected.

11. The heating system control of claim 1 including means for utilizing the control selectively to provide manually adjustable infinite control of the heater from zero energization to full energization.

12. The heating system control of claim 11 wherein said last name means comprises means for providing infinite adjustment of said regulating means.

13. In a heating system having an electric heater, a control for regulating the heater comprising:
   means for setting a preselected temperature to be reached by the system;
   means for sensing the temperature of the system;
   means for obtaining the temperature difference between the instantaneous temperature of the system sensed by said sensing means and said preselected temperature;
   means for energizing the heater to bring the temperature of the system up to the preselected temperature and for regulating the energization of the heater subsequent to the system reaching said preselected temperature to maintain the system temperature substantially at said preselected temperature including means for obtaining the rate of change of said temperature difference, means for amplifying said rate of change of said temperature difference, and adding the amplified rate of change of said temperature difference to said temperature difference to provide an output signal which is proportional to the sum of the temperature difference and the amplified rate of change of the temperature difference, and means for comparing said output signal with a reference voltage which is a function of the difference between the preselected temperature and the sensed temperature to provide a regulating signal to terminate the energizing of the heater accurately prior to the sensed temperature reaching said preselected temperature to permit the heat capacity of the system to bring the temperature thereof accurately to said preselected temperature; and
   means for controlling the energization of the heater as a function of said regulating signal.

* * * * *